Aug. 14, 1923. Re. 15,671
A. V. T. DAY
TRAFFIC CONTROLLING SYSTEM
Original Filed July 10, 1911
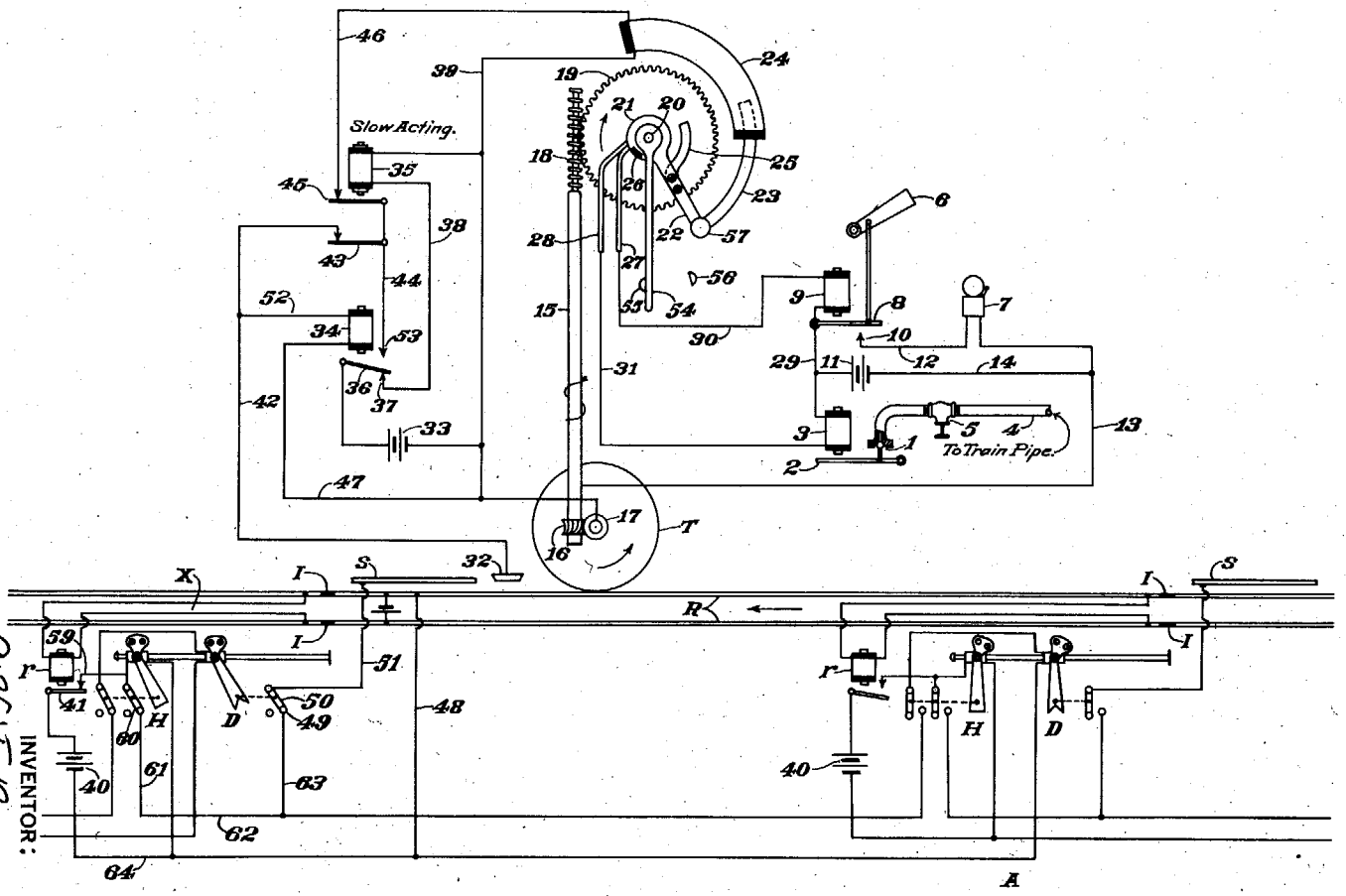
INVENTOR:
A. V. T. Day,
BY A. Z. Vehicle
His ATTORNEY Reissued Aug. 14, 1923. Re. 15,671

UNITED STATES PATENT OFFICE.

ALBERT V. T. DAY, OF RYE, NEW YORK, ASSIGNOR TO THE UNION SWITCH AND SIGNAL COMPANY, OF SWISSVALE, PENNSYLVANIA, A CORPORATION OF PENNSYLVANIA.

TRAFFIC-CONTROLLING SYSTEM.

Original patent a continuation of application Serial No. 637,774, filed July 10, 1911. Original No. 1,308,401, dated July 1, 1919, Serial No. 638,229, filed July 12, 1911. Application for reissue filed February 6, 1923. Serial No. 617,395.

*To all whom it may concern:*

Be it known that ALBERT V. T. DAY, a citizen of the United States, residing at Rye, in the county of Westchester and State of New York, has invented certain new and useful Improvements in Traffic-Controlling Systems, of which the following is a specification, reference being had therein to the accompanying drawings, forming part thereof.

This invention relates to traffic controlling systems and particularly to such systems in which the controlling devices are carried on a railway vehicle.

Broadly the objects of this invention are reliability of operation, and simplicity and cheapness of construction and maintenance. Other objects and advantages of this invention will appear from the foregoing description.

In its broad aspect the invention comprehends the combinations of a train retarding and a signaling mechanism on a railway vehicle and having normal tendencies to assume retarding and danger conditions, respectively, within a predetermined period, and extraneous controlling means for restoring the mechanisms to non-retarding and clear conditions, respectively.

The invention also comprehends various more particular features and combinations of parts as will hereinafter appear.

The present application is a continuation of my application filed on July 10, 1911, Serial No. 637774, so far as the subject-matter common to the two is concerned.

I shall now describe the embodiment of the invention illustrated in the accompanying diagram, and shall thereafter point out the novel features thereof in claims.

In the diagram one track only is shown, the rails R of which are divided by insulation I into the usual signal blocks. Two signal stations A and B and the block between these stations together with a portion of the block in rear and the block in advance of the block A—B, are shown. The conventional home and distant signal system is shown in which the home signals H are governed directly by the track relays *r* at their respective stations, and the distant signals D are governed by the respective home signals H of the station immediately in advance. A train T is in the block A—B and hence both of the signals at station A are at danger, while both signals at station B are at clear, indicating clear traffic conditions in the two blocks next ahead of the block A—B. By the clear or non-retarding traffic conditions, as used herein, is meant those conditions of a block which are ordinarily indicated by a clear signal; while by danger or retarding traffic conditions is meant those conditions which are ordinarily indicated by a danger or caution signal. The train T carries a signaling apparatus and a retarding apparatus which are arranged to operate automatically and independently of any extraneous control, unless prevented by extraneous control; in other words, the retarding apparatus will, after a predetermined interval, retard the train, and the signals will assume the danger position unless prevented by extraneous means. In reference to the train-retarding apparatus I shall speak of a clear or non-retarding condition as the condition which the apparatus assumes in response to clear or non-retarding traffic conditions, and of danger or retarding condition as the condition which the apparatus automatically assumes under danger or retarding traffic conditions. Similarly, I shall speak of danger or retarding condition in reference to the signaling apparatus as the condition assumed by the apparatus under danger or retarding traffic conditions, and of clear or non-retarding condition as the condition assumed by the apparatus in response to clear or non-retarding traffic condition.

The retarding apparatus, otherwise referred to as the train stop, consists of means for opening a vent connecting with the train pipe and thus applying the brakes. The signaling apparatus is of the class commonly known as cab signals and includes both a visual signal being illustrated as a semaphore and the audible signal as a bell. The valve 1 of the retarding apparatus is operated by the movement of an armature 2 of a controlling electromagnet 3, and seats in the entrance to a pipe 4 connected to the train pipe, and so controls the escape of air from the train pipe. When the magnet 3 is de-energized, the armature 2 falls by gravity or other retractile force and the valve 1 opens and the brakes are applied to the train in the usual way. A hand valve 5 is provided in the pipe 4 to regulate the rapidity of the escape of air when the valve 1 is opened, and hence the character of the application of the brakes. As a general rule the valve 5 will be so adjusted that the opening of the valve 1 will cause a service application of the brakes to be made.

The semaphore 6 and bell 7 of the signaling apparatus are governed by a contact finger 8 controlled by a controlling electromagnet 9. The semaphore is the so-called upper quadrant signal and is mechanically connected to the contact finger 8 so that it is held up to clear position when the contact finger is attracted. When the magnet 9 is de-energized the contact finger 8 falls by gravity or other retractile force and pulls the semaphore 6 to danger and at the same time engages a contact stop 10 and closes an electric circuit through the bell 7 as follows: from the battery 11, through contact finger 8, contact stop 10, wire 12, bell 7 and wire 14 back to the battery.

To control the circuit of the magnets 3 and 9, controlling mechanism is provided responsive to the movement of the train T to open the circuits after a predetermined interval of movement of the train. A shaft 15 is connected to a wheel of the train T, preferably one of the drive wheels of the locomotive, by the engagement of a worm 16 on the shaft with a worm 17 on the wheel, and is rotated thereby in the direction indicated by the arrow as the train proceeds. A worm 18 on the opposite end of the shaft 15 meshes with a worm-wheel 19 fixed on a shaft 20 and rotates it in the direction indicated by the arrow. Mounted loosely on the shaft 20 is the hub 21 of an arm 22, on the outer end of which arm is a soft iron arcuate core 23, of an arcuate solenoid 24. When the solenoid 24 is energized the core 23 is drawn up into the solenoid and is held there while the solenoid remains energized, but when the solenoid is de-energized the core tends to fall out by gravity or other retractile force. The arm 22, however, is frictionally connected to the worm-wheel 19 by a friction spring 25, which is a flat spring attached to the arm 22 and bears against the face of the worm-wheel 10 with sufficient friction to cause the arm 22 to move with the worm-wheel 19, while permitting independent relative movement between the two parts, and therefore, the core 23 can fall out of the solenoid 24 only as fast as the rotation of the worm-wheel 19 will permit. On the periphery of the hub 21 is inserted an insulation 26, and a signaling apparatus brush 27 and a retarding apparatus brush 28 engages the periphery of the hub 21. The insulation 26 is so positioned that the brushes 27 and 28 wipe on the insulation when the core 23 is nearly out of the solenoid, as shown in the diagram. When the brush 27 is in contact with the hub 21, the signal apparatus controlling magnet 9 is energized as follows: from the battery 11 through wire 29, magnet 9, wire 30, brush 27, hub 21, shaft 20, worm-wheel 19, shaft 15 and wires 13 and 14 back to the battery. When the brush 28 is in contact with the hub 21, the retarding apparatus controlling magnet 3 is energized as follows: from the battery 11 through wire 29, magnet 3, wire 31, brush 28, hub 21, shaft 20, worm-wheel 19, shaft 15, and wires 13 and 14 back to the battery. It is apparent, therefore, that when the brushes 27 and 28 are in contact with the periphery of the hub 21, the magnets 3 and 9 are energized in parallel and the signaling and retarding apparatuses are both held at clear or non-retarding position; but when the brushes wipe on to the insulation 26, the magnets are de-energized and the respective apparatuses automatically assume danger or retarding position or condition. In its controlling condition, therefore, that is, the condition which exists when the brushes are in contact with the periphery of the hub 21, this controlling mechanism prevents the signaling and retarding apparatuses from performing their natural functions and assuming danger or retarding position or condition; but in its non-controlling condition, that is, the condition which exists when the brushes are in contact with the insulation 26, the controlling mechanism no longer prevents the signaling and retarding apparatuses from performing their natural functions.

To reset the controlling mechanism, extraneous means are provided for energizing the solenoid 24 and drawing the core 23 up into the solenoid and so rotating the hub 21 until the insulation 26 is at its maximum distance from the brushes 27 and 28. The extraneous energizing means are under the control of the signals at the various signal stations along the track, and, as illustrated, are directly controlled by the distant signals, and are responsive to clear traffic conditions as indicated by clear distant signals to reset the controlling mechanism. At each signal station is a contact rail S in position to be engaged by a contact shoe 32 on the train T. The portion of the resetting mechanism which is carried by the train includes a battery 33, a quick acting magnet 34 and a slow acting magnet 35. The quick acting magnet 34 is energized only when the contact shoe 32 is in contact with the contact rail S, as will be explained later, and when the magnet 34 is de-energized, the slow-acting magnet 35 is energized as follows: from the battery 33, through contact finger 36 controlled by the magnet 34, back contact 37, wire 38, magnet 35, and wire 39 back to the battery. When the shoe 32 engages the contact rail S, provided the distant signal D is at clear, the solenoid 24 is energized as follows: from the local battery 40 through contact finger 41 under the control of the track relay *r*, wire 59, contact finger 60 under the control of the home signal H, wires 61, 62 and 63, contact point 49, contact finger 50, under the control of the distant signal D, wire 51, contact rail S, contact shoe 32, wire 42, contact finger 43 of the slow acting magnet, wire 44, contact finger 45 of the slow acting magnet, wire 46, solenoid 24, wires 39 and 47, axle and wheels of train T, rails R and wires 48 and 64 back to the battery. At the same time the quick acting magnet 34 is energized in parallel with the solenoid 24 through a circuit leading from the wire 42 through the wire 52, magnet 34, and wire 47 to the axle and wheels of train T. The magnet 34, therefore, immediately picks up the contact finger 36 and connects the battery 33 in parallel into the energizing circuit of the solenoid 24 as follows: from the battery 33 through contact finger 36, front contact stop 53, wire 44, contact finger 45, wire 46, solenoid 24, and wire 39 back to the battery. The solenoid 24 is, therefore, energized by a double battery force and hence draws up the core 23 and resets the controlling mechanism very quickly upon the engagement of the shoe 32 with the contact rail S. The picking up of the contact finger 36 breaks the circuit of the slow acting magnet 35 at the back contact point 37, but since the magnet 35 is slow acting, it holds up its contact fingers 43 and 45 sufficiently long to insure the complete energization of the solenoid 24 and the complete resetting of the controlling mechanism. The contact fingers 43 and 45 are soon dropped, however, and the solenoid 24 is then de-energized and the mechanism is again ready to start from controlling to non-controlling position irrespective of continued engagement of the shoe 32 with the contact rail S.

It will be noted that the slow acting magnet 34 serves to permit the use of a short contact rail, since all the extraneous energization of the train-carried apparatus that is needed is enough to energize the quick magnet 34, which is sufficiently quick acting to require but substantially an instantaneous contact of the shoe 32 with the rail S. When the finger 36 is picked up a local circuit is established through the magnet 34 as follows: from battery 33, contact finger 36, wire 44, contact finger 43, wires 42 and 52, magnet 34, and wires 47 and 39 back to the battery. Therefore, the finger 36 is held up against its front contact and the solenoid 24 is energized by the battery 33 as long as the slow acting magnet 35 holds up its contact finger, and the magnet 35 is made sufficiently slow acting to hold the circuit through the solenoid closed long enough to insure that the core 23 will be completely drawn up into the solenoid. Hence the length of time required to reset the apparatus is entirely independent of the duration of contact required between the shoe 32 and the contact rail S.

The parts are so designed that after the resetting of the mechanism as above described, the train will run one complete block and to the point *x* in the next block, at which point the controlling mechanism reaches non-controlling position, provided the mechanism is not reset at the signal station at the entrance to the block.

The point *x* is a safe stopping distance from the end of the block. To enable the operator to run under control after passing a caution signal and after reaching the point *x*, a manual hold-out is provided. This consists of a hand lever 54 mounted loosely on the end of the shaft 20 and free to oscillate between a back stop pin 55 and a front stop pin 56. The lever 54 hangs by gravity against the back stop pin 55 in such position that a pin 57 on the end of the arm 22 strikes the lever 54 just as the retarding apparatus brush 28 wipes on the insulation 26. The signal apparatus brush 27 is slightly in advance of the brush 28 with the result that the bell 7 is rung and the semaphore 6 moved to danger a short interval of time before the valve 1 is opened and the brakes applied. When the operator receives this warning signal he may swing the lever 54 up to the front stop pin 56 and thus, due to the engagement of the pin 57 with the lever 54, rotate the hub 21 a slight distance and partially reset the mechanism, in which position it may be held by the hand lever as long as the operator remains at his post. Should he release the hold-out lever, his train could run but comparatively short distance before the brakes would be automatically applied, the amount of this limited unretarded movement being determined by the amount of back-set imparted to the hub 21, depending on the position of the stop 56. Hence the headway permitted by the manual reset may be but fifty or one hundred feet, allowing the operator a short instant to turn away from his post, while his train is moving slowly, without incurring an automatic application of the brakes, but not giving him any appreciable time to leave his post without causing an automatic application of the brakes when his train is running at high speed. It will be noted that any failure of the system is a safe failure, that is, the warning signals will be given and the brakes applied unless prevented. This hold-out, therefore, is serviceable to enable the operator to run in case of any derangement or failure of the apparatus.

In case the train is run backward, the core 23 will be carried up into the solenoid until the arm 22 engages the solenoid, after which further backward movement of the core and connected parts is prevented, and the friction spring 25 will slip idly over the face of the worm-wheel 19.

It is obvious that various modifications may be made in the embodiment of this invention shown and above particularly described within the principle and scope of the invention.

In the present application the combination of a constantly operating run-down device and vehicle governing means controlled by said device is not claimed broadly, such invention being set forth and claimed in my co-pending application, Serial No. 637773, filed on July 10, 1911, for traffic controlling systems.

What is claimed is:

1. A railway traffic controlling system comprising a train stop and a signaling apparatus carried on a railway vehicle, the train stop having an automatic tendency to retard the train and the signaling apparatus having an automatic tendency to assume the danger position, the signaling mechanism being constructed and arranged to assume danger position in advance of the train retarding mechanism, controlling mechanism for the train stop and signaling apparatus having a controlling and non-controlling condition and having an automatic tendency to change from controlling to non-controlling condition in accordance with movement of the train and to permit the train stop and signaling apparatus to retard the train and assume the danger position respectively, and extraneous controlling means responsive to clear traffic conditions in advance to reset the controlling mechanism away from controlling condition.

2. In combination, a railway vehicle, means on the vehicle adapted to change gradually toward an ultimate condition, a warning signal controlled by said means and operated thereby just before its ultimate condition is reached; a device on the vehicle for causing an application of the brakes and operated by said means when it reaches its ultimate condition; and devices located in the trackway for causing said means to be ineffective to control the said signal or device when safety conditions exist.

3. In combination, a railway vehicle, means on the vehicle arranged to change toward an ultimate condition in accordance with the distance travelled by the vehicle; a warning signal on the vehicle operated by said means just before it reaches its ultimate condition; a device on the vehicle for causing an application of the vehicle brakes when said means reaches its ultimate condition; and devices in the trackway which under one set of conditions will permit of the operation of the warning signal by said means and if disregarded the device for causing the application of the vehicle brakes and which under other conditions will prevent the said means from operating the warning signal or the device for causing the application of the vehicle brakes.

4. In combination, a railway vehicle, means on the vehicle arranged to change progressively toward an ultimate condition, and arranged when reset to automatically resume its progressive change toward ultimate condition, a warning signal on the vehicle operated through said means before it reaches its ultimate condition, a device on the vehicle to cause an application of the brakes and operated through said means when it reaches its ultimate condition, and devices located in the trackway adapted under one set of conditions to permit the said means to cause an operation of said signal and said brake applying device or either of them, and under another set of conditions to reset the said means before an operation of the signal or brake applying device or either of them.

5. In combination, a railway vehicle; means on the vehicle including an electric device arranged to change progressively toward and ultimate condition and when reset to automatically resume its change toward ultimate condition; a warning signal on the vehicle operated by said means before it reaches its ultimate condition; a device on the vehicle to cause an application of the brakes and operated through said means when it reaches its ultimate condition; and devices located in the trackway with which contact is made to supply current to the electric device of said means, a source of current, and switches for connecting said source of current with the track device according to whether the said means is to be reset or to be permitted to reach its ultimate condition.

6. In combination, a railway vehicle, means thereon arranged to change gradually toward an ultimate condition, a warning signal and a normally inactive vehicle stopping device controlled successively by said means, and devices located in the trackway for causing said means to be ineffective to control said signal or said train stopping device when safety conditions exist.

7. In combination, a railway vehicle, means thereon geared with an axle of the vehicle to change progressively toward an ultimate condition in accordance with the distance traveled by the vehicle, devices located in the trackway for causing said means to be restored away from said ultimate condition, and a warning signal and a normally inactive vehicle stopping device controlled successively by said means.

8. Railway traffic controlling apparatus comprising a vehicle, means thereon arranged to change gradually toward an ultimate condition, a warning signal and a normally inactive brake controlling device operated successively by said means, and devices located at intervals in the trackway and responsive to clear traffic conditions in advance for resetting said means away from said ultimate condition before the warning signal is operated.

9. In combination, a railway vehicle, a warning signal and a valve in control of an air vent carried thereon, means on the vehicle adapted to be constantly driven toward an ultimate condition whereby the warning signal will be operated and the valve will be opened successively upon reaching said ultimate condition, together with devices located in the trackway for causing said means to be restored away from said ultimate condition.

10. In combination, a railway vehicle, means on the vehicle adapted to be driven constantly toward an ultimate condition, a warning signal and a controlling device on the vehicle controlled successively by said means upon reaching said ultimate condition, together with devices located in the trackway and responsive to clear track conditions ahead for causing said means to be restored away from said ultimate condition.

11. In combination, a railway vehicle, means thereon arranged to change gradually toward an ultimate condition, a warning signal and valve-opening apparatus on the vehicle, controlled successively by said means upon reaching said ultimate condition, and devices located in the trackway for causing said means to be restored away from said ultimate condition, said means being adapted to automatically resume its change toward the said ultimate condition after each restoration.

In testimony whereof I affix my signature.

ALBERT V. T. DAY.